(12) United States Patent
Saito

(10) Patent No.: US 6,275,889 B1
(45) Date of Patent: Aug. 14, 2001

(54) CONNECTION CONTROL APPARATUS

(75) Inventor: Tomoki Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/626,459

(22) Filed: Jul. 26, 2000

(30) Foreign Application Priority Data

Jul. 29, 1999 (JP) ................................. 11-215972

(51) Int. Cl.[7] .................................................. G06F 13/00
(52) U.S. Cl. ........................ 710/129; 710/131; 710/240; 709/227
(58) Field of Search ..................................... 710/129, 126, 710/131, 240, 220, 262, 263, 36, 46; 709/227, 228

(56) References Cited

U.S. PATENT DOCUMENTS

| | | | |
|---|---|---|---|
| 4,875,037 | * 10/1989 | Escolar | 340/825.01 |
| 5,140,582 | * 8/1992 | Tsuboi et al. | 370/60 |
| 5,475,679 | * 12/1995 | Munter | 370/58.2 |
| 5,568,397 | * 10/1996 | Yamashita et al. | 364/491 |
| 5,640,603 | * 6/1997 | Meritt et al. | 710/38 |
| 5,835,728 | * 11/1998 | Shinomiya et al. | 709/242 |
| 6,038,625 | * 3/2000 | Ogino et al. | 710/104 |

\* cited by examiner

*Primary Examiner*—Ario Etienne
(74) *Attorney, Agent, or Firm*—Sughrue, Mion, Zinn, Macpeak & Seas, PLLC

(57) ABSTRACT

There is provided a connection control apparatus which, even when a plurality of such connection control apparatuses are connected to a bus such as the 1394 bus through which packet-based bidirectional serial communication is possible and to which a plurality of AV devices can be connected, makes it possible to know to which connection control apparatus the right of controlling each device connected to the bus belongs by collecting information about the control status of each connection control apparatus, thereby to carry out a high level of management of connections to and controls of the bus. Each connection control apparatus connected to a bus, through which packet-based bidirectional serial communication is possible and to which a plurality of AV devices can be connected, comprises a control flag register and a control information register for storing the status of connection of the present device through the bus to other devices as well as the status of connection of the other devices to one another through the bus.

21 Claims, 12 Drawing Sheets

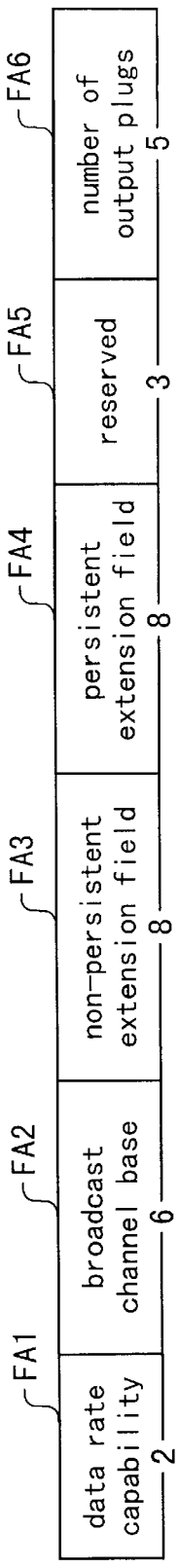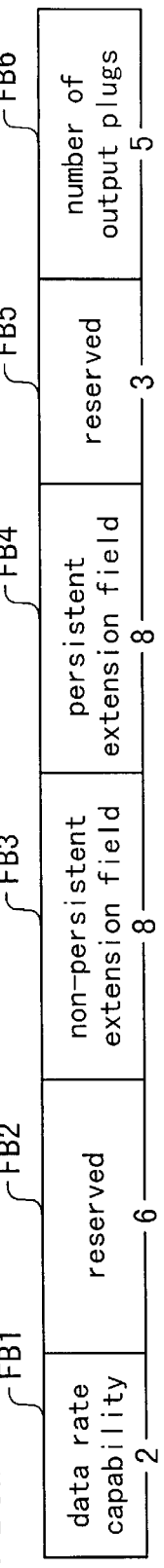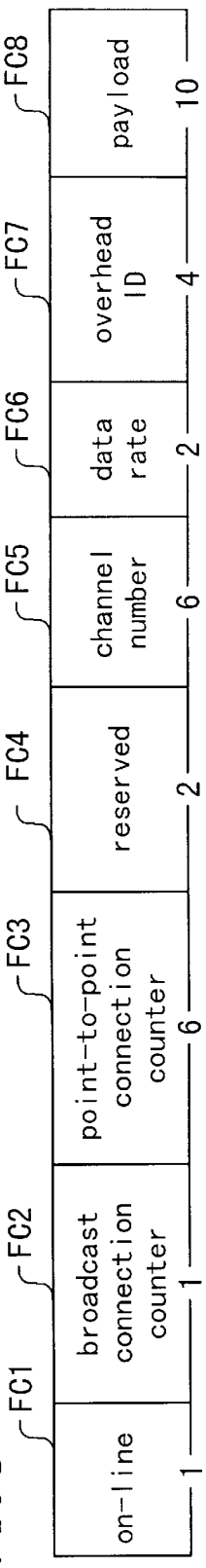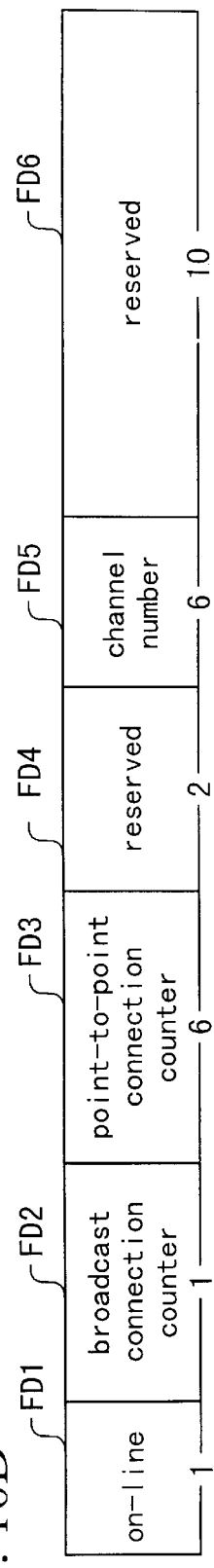
FIG. 10A  OUTPUT MASTER PLUG REGISTER (oMPR)
FIG. 10B  INPUT MASTER PLUG REGISTER (iMPR)
FIG. 10C  OUTPUT PLUG CONTROL REGISTER (oPCR)
FIG. 10D  INPUT PLUG CONTROL REGISTER (iPCR)

CONNECTION CONTROL APPARATUS

BACKGROUND OF THE INVENTION

This invention relates generally to a connection control apparatus for use in a communication network and more particularly to a connection control apparatus for controlling, in a network with a bus such as a high-speed serial bus IEEE 1394 (refer to "IEEE Standard for a High Performance Serial Bus", IEEE Standard 1394-1995) to which a personal computer, its peripheral device and/or an audio visual device (hereinafter referred to as a "AV device") can be connected, those devices connected to such a bus.

In recent years, personal computers become common in homes, and various techniques have been and are being developed for improving the usability of such personal computers by their users. It has also become common for audio and visual information to be treated in digital form. For example, data from a digital video camera can be processed in a personal computer at home. Under such circumstances, new bus systems such as a USB (Universal Serial Bus) and an IEEE 1394 bus have been proposed as new technology for improving the connectability between a computer and its peripheral device, such as a printer or an image scanner, and actually been brought to market in some fields.

As compared to the USB that needs interfacing by a computer for the connection between its peripheral devices, the IEEE 1394 bus does not need any interfacing by a computer for such connection. The latter can therefore be used not only for connecting a personal computer to its peripheral devices such as a printer, a hard disc drive, or an image scanner, but also for transferring main and control signals among video devices such as a digital video camera and audio devices. Since it is thus possible to construct a network by connecting a plurality of devices complying with the IEEE 1394 standard (hereinafter referred to simply as "1394 devices"), this standard is considered to be a promising standard for use in a LAN for home networking.

FIG. 9 shows, by way of example, a network constructed to connect AV devices, which are 1394 devices, using an IEEE 1394 bus. In the example shown in FIG. 9, five AV devices 80a to 80e all of which are 1394 devices are connected to an IEEE 1394 bus B10. In order to associate an isochronous channel when transferring data between AV devices, each AV device is provided with a master plug register (MPR) and a plug control register (PCR) as prescribed in the IEC 61883 standard ("Consumer Audio/Video Equipment—Digital Interface—Part 1: General", Reference Number CEI/IEC 61883-1: 1998).

Each of these registers comprises an input and an output register for audio data and video data, and each master plug register is provided with an input master plug register (iMPR) and an output master plug register (oMPR), while each plug control register is provided with an input plug control register (iPCR) and an output plug control register (oPCR).

In the example shown in FIG. 9, the AV devices 80a to 80d comprise iMPRs 82a to 82d, respectively, and the AV device 80e comprises an oMPR 84. The iMPR 82a to 82d comprise iPCRs 86 and 88, an iPCR 90, an iCPR 92 and iCPRs 94 and 96, respectively, and the oMPR 84 comprises an oPCR 98. In FIG. 9, shown at C10 is an isochronous channel that is established to transmit or receive data when an isochronous transfer of the data should take place between AV devices connected to the IEEE 1394 bus B10.

FIG. 10 illustrates detailed formats for the above-described registers, wherein (a) shows the format for the output master plug register (oMPR), (b) the format for the input master plug register (iMPR), (c) the format for the output plug control register (oPCR) and (d) the format for the input plug control register (iPCR). These formats have been standardized. The numerals shown at the bottom of each format represent the numbers of bits of respective data constituting the relevant format.

Each of the AV devices 80a to 80e comprises a respective single one of the iMPRs 82a to 82d and oMPR 84, each of which manages the number of plug control registers in a respective one of the AV devices, i.e., iPCRs 86 to 96 and oPCR 98. The number of oPCRs and iPCRs which can be present in one AV device is thirty-one at maximum. The oPCR and IPCR include, for the information required to establish a connection, fields FC2 and FD2 each for storing information indicating the presence of a broadcast connection, fields FC3 and FD3 each for storing information indicating the number of point-to-point connections, fields FC5 and FD5 each for storing information indicating an isochronous channel number and so on, respectively. The oPCR further includes a field FC6 for storing information indicating a transfer rate of isochronous data flow and a field FC8 for storing information indicating a bandwidth. Addresses of the registers in which the MPR and PCR are described are described, as shown in FIG. 11, in addresses from FF FF F0 09 00h to FF FF F0 09 FFh (h represents hexadecimal notation) within a CSR (Command and Status Register) space defined in the IEEE 1394 standard. FIG. 11 illustrates a structure of the CSR space according to the IEEE 1394 standard.

For isochronous data output from an AV device, a path for sending the isochronous data between AV devices can be determined by making a proper setting to these PCRs, whereby it is possible to have a data transfer made between any arbitrary AV devices.

Referring again to FIG. 9, the concept of connection utilizing PCRs will be described. The connection utilizing PCRs is categorized into two types, i.e., a point-to-point connection and a broadcast connection.

The point-to-point connection is a connection in which an oPCR of an AV device is connected through an isochronous channel to an iPCR of another AV device. This type of connection corresponds, for example, to the data flow between the oPCR 98 of the AV device 80e and the iPCR 90 of the AV device 80b shown in FIG. 9. This connection is protected so that the relevant registers can be rewritten only by the device that established this connection, or by the relevant control application program.

It is also possible to have a plurality of point-to-point connections present with respect to the same single PCR. In the example shown in FIG. 9, this corresponds to the connection between the oPCR 98 of the AV device 80e and the iPCR 94 of the AV device 80d. In this example, there are three point-to-point connections which use the same isochronous data flow.

The broadcast connection is composed of a broadcast-out connection for associating one oPCR of an AV device only with one isochronous channel and a broadcast-in connection for associating one iPCR of another AV device only with one isochronous channel.

In the example of FIG. 9, the association of the oPCR 98 of the AV device 80e with a broadcast channel number (usually set to "63") for the isochronous data is a broadcast-out connection, while the association of the iPCR 92 of the AV device 80c with the broadcast channel number for the isochronous data is a broadcast-in connection.

These two types of broadcast connections are established independently of the mutual relation in the condition of the sender and the recipient. Any device other than those devices or control application programs which have established the broadcast connection can alter (or rewrite) the PCR not only to cut the connection but also to allocate the broadcast isochronous channel of the currently transferring device.

The data transmission/reception after the establishment of a connection between AV devices can be started by controlling the sending and receiving AV devices by AV/C (Audio Video Control) commands defined in "AV/C Digital Interface Command Set Version 3.0", 1394 Trade Association, Apr. 15, 1998 or "AV/C Tape Recorder/Player Subunit Specification Version 2.1", 1394 Trade Association, Jan. 11, 1998. As AV/C commands, a play command, a stop command, a fast forward command, a rewind command, a record command, a slow forward command and so on are available. The transmission/reception of the AV/C commands onto/from the 1394 bus is carried out in accordance with the Function Control Protocol prescribed in the EC 61883 Standard. When an isochronous transfer is completed, the connection is released by clearing the setting to the transmitting/receiving AV devices.

Based on the above-described setting to the PCRs, a controller (connection control apparatus) can establish or release a connection between 1394-compliant AV devices. One example of such establishment and release of a connection between AV devices will now be described.

FIG. 12 illustrates the conventional way of controlling connections. It is here assumed that four 1394 devices 100a to 100d and one controller 102 are connected to a 1394 bus B12 as shown in FIG. 12. For the sake of simplicity, it is further assumed that the 1394 devices 100a to 100d have no function of controlling connections.

The controller 102 can switch two connection pairs between the 1394 device 100a and the 1394 device 100c and between the 1394 device 100b and the 1394 device 100d to two connection pairs between the 1394 device 100a and the 1394 device 100d and between the 1394 device 100b and the 1394 device 100c and vice versa.

In this case, since there is only one controller 102 on the 1394 bus B12 and each 1394 device has only one connection established, controls of the 1394 devices 100a to 100d such as playing and recording by their AV/C commands will not conflict with each other.

We now consider another case where six 1394 devices 104a to 104f and three controllers 106a to 106c are connected to a 1394 bus B14 as shown in FIG. 13. FIG. 13 is an illustration showing one conventional bus structure and exemplary connections made therein from which problems of the prior art will be apparent. For the sake of simplicity, it is assumed that the 1394 devices 104a to 104f have no connection control functions.

Let's consider a situation where the 1394 devices 104a and 104b are connected respectively to the 1394 devices 104d and 104c by the controller 106a (as indicated by solid-line arrows in FIG. 13), the 1394 device 104a is connected to the 1394 device 104e by the controller 106b (as indicated by a dotted arrow in FIG. 13) and the 1394 device 104a is connected to the 1394 device 104f by the controller 106c (as indicated by a dot-and-dash arrow in FIG. 13).

In this situation, three connections overlap with each other at the 1394 device 104a. In the situation shown in FIG. 13, plural controllers 106a to 106c coexist on the same 1394 bus B14. When the connection set by the controller 106a between the 1394 device 104a and the 1394 device 104d is a point-to-point connection, this connection will be protected as described before. However, even if the connection between these devices is protected, the control of the 1394 devices can also be done by other controllers 106b and 106c. This is because, in the case of a point-to-point connection, the connection between the 1394 devices is protected but the control to these 1394 devices is not protected.

Let's consider a case where a dubbing operation is performed between the 1394 device 104a and the 1394 device 104d. In this case, it is assumed that the 1394 devices 104a and 104d are video devices.

Suppose that the controller 106a controls a connection between the 1394 devices 104a and 104d and protects the connection. By means of this protection, the connection between the 1394 devices 104a and 104d is reliably protected. However, since no protection is made with respect to the control of 1394 devices as described above, there may occur such a problem that the dubbing operation is disturbed when an AV/C command such as a play command, a record command and a stop command is issued to the 1394 device 104a, 104d, for example, by the controller 106b.

The above problem seems to be solved by applying, to the way of controlling 1394 devices, such an idea of protection that when a connection between 1394 devices is controlled by a certain controller the right of controlling a transmitting operation, a receiving operation and so on is given to that controller. However, in the case such as that shown in FIG. 13 where up to three connections have been established for the 1394 device 104a, it is not known to which controller the right of controlling the 1394 device 104a belongs. Thus, there is a problem that it cannot eventually be determined to which controller the right of controlling the 1394 device 104a belongs.

When only two controllers are connected to a 1394 bus, it will easily be determined that any connections other than those made by the present controller have been made by another controller. However, when there are more than two controllers connected and when only one connection has been established in each 1394 device as in the 1394 devices 104b, 104c, 104d, 104e and 104f, there will occur the problem that it is not possible for a given controller to know by which controllers connections, other than those established by this given controller, have been established.

SUMMARY OF THE INVENTION

It is therefore an object of the present invention to provide a connection control apparatus which makes it possible, even when a plurality of such connection control apparatuses have been connected to a bus such as a 1394 bus through which bidirectional serial communication is possible by means of packets and to which a plurality of AV devices can be connected, to know to which connection control apparatus the right of controlling each device connected to the bus belongs by collecting information about the control statuses of the respective connection control apparatuses, thereby to carry out advanced management of connections onto and controls of the bus.

In order to solve the above problems, according to a first aspect of the present invention, there is provided a connection control apparatus adapted to be connected to a bus through which packet-based bidirectional serial communication can be performed and to which a plurality of apparatuses can be connected, the connection control apparatus comprising memory means for storing a status of logical connection of the present apparatus through the bus to other apparatuses and for storing a status of logical connection among the other apparatuses through the bus.

The above invention may further be characterized by comprising reading means for reading the statuses of connection stored in the memory means of the other apparatuses through the bus.

The above invention may further be characterized in that the status of connection includes an identifier of a destination apparatus.

The above invention may further be characterized in that the status of connection includes information indicative of priorities of connections. The above invention may further be characterized in that the bus is a bus which complies with the IEEE 1394 bus standard.

The above invention may further be characterized in that the status of connection includes history information of updating the status of connection, the connection control apparatus further comprising updating means for comparing the status of a connection read by the reading means with that stored in the present apparatus to update the status of the connection stored in the present apparatus when the status of the connection stored in the present apparatus is older.

The above invention may further be characterized in that the status of the connection includes information about another apparatus which has released a connection established by the present apparatus.

The above invention may further be characterized by further comprising determination means for determining a right of controlling each apparatus connected to the bus based on the information indicative of priorities.

In order to solve the above-described problems, according to a second aspect of the present invention, there is provided a connection control apparatus connected to an IEEE 1394 bus for controlling a connection between apparatuses each having a plug control register, the connection control apparatus comprising a plug control register controlling section for transmitting/receiving packets through the 1394 bus to control the plug control registers of other apparatuses and to generate connection information between the apparatuses, a control information register for storing the connection information generated by the plug control register controlling section, a control flag register for indicating a presence of an update of the control information register and an amount of information in the control information register, an apparatus control section for transmitting/receiving packets through the 1394 bus to control operations of those apparatuses connected to the 1394 bus, and an apparatus control right judging section for collecting values in the control information register and the control flag register with respect to all the apparatuses connected to the same bus to determine those apparatuses whose controls are to be allowed and to inform the apparatus control section of those apparatuses.

The above invention may further be characterized in that the control flag register comprises a data-length field for representing an amount of information in the control information register, and a history information field whose value represents a presence of an update of the control information register and is incremented each time the control information register is updated.

The above invention may further be characterized in that the control information register comprises a first field for representing whether the plug control register is for input or for output, a second field for representing a serial number of the plug control register provided in the apparatus, a third field for representing a value in a point-to-point connection counter of the plug control register, a fourth field for representing a type of the control information register, and objective bus ID and objective physical ID fields for representing a bus ID and a physical ID of the apparatus provided with the plug control register.

The above invention may further be characterized in that the fourth field for representing the type of the control information register is a field for storing a value indicating that information about the plug control register set by the present apparatus is stored or a value indicating that information about the plug control register by which the present apparatus released a point-to-point connection established by another apparatus is stored.

The above invention may further be characterized in that the control flag register and the control information register are arranged in a control status register space as defined in the IEEE 1212 standard.

Thus, according to the present invention, even when a plurality of connections are set to one apparatus by a plurality of connection control apparatuses, it is possible to give the right of controlling an apparatus to one specific connection control apparatus, so that the apparatus can be controlled without any conflict from other connection control apparatuses.

It is also possible to know by which connection control apparatus a connection between apparatuses has been established even when there are more than two connection control apparatuses present on the bus, so that a high level of management of connections of apparatuses present on the bus can be achieved.

BRIEF DESCRIPTION OF THE DRAWINGS

FIG. 10 is an illustration showing detailed formats of the registers, wherein (a) is the format of the output master plug register (oMPR), (b.) the format of the input master plug register (iMPR), (c) the format of the output plug control register (oPCR), and (d) the format of the input plug control register (iPCR);

DESCRIPTION OF THE PREFERRED EMBODIMENT OF THE INVENTION

A connection control apparatus according to an embodiment of the present invention will now be described in detail with reference to the accompanying drawings.

Figure 1:
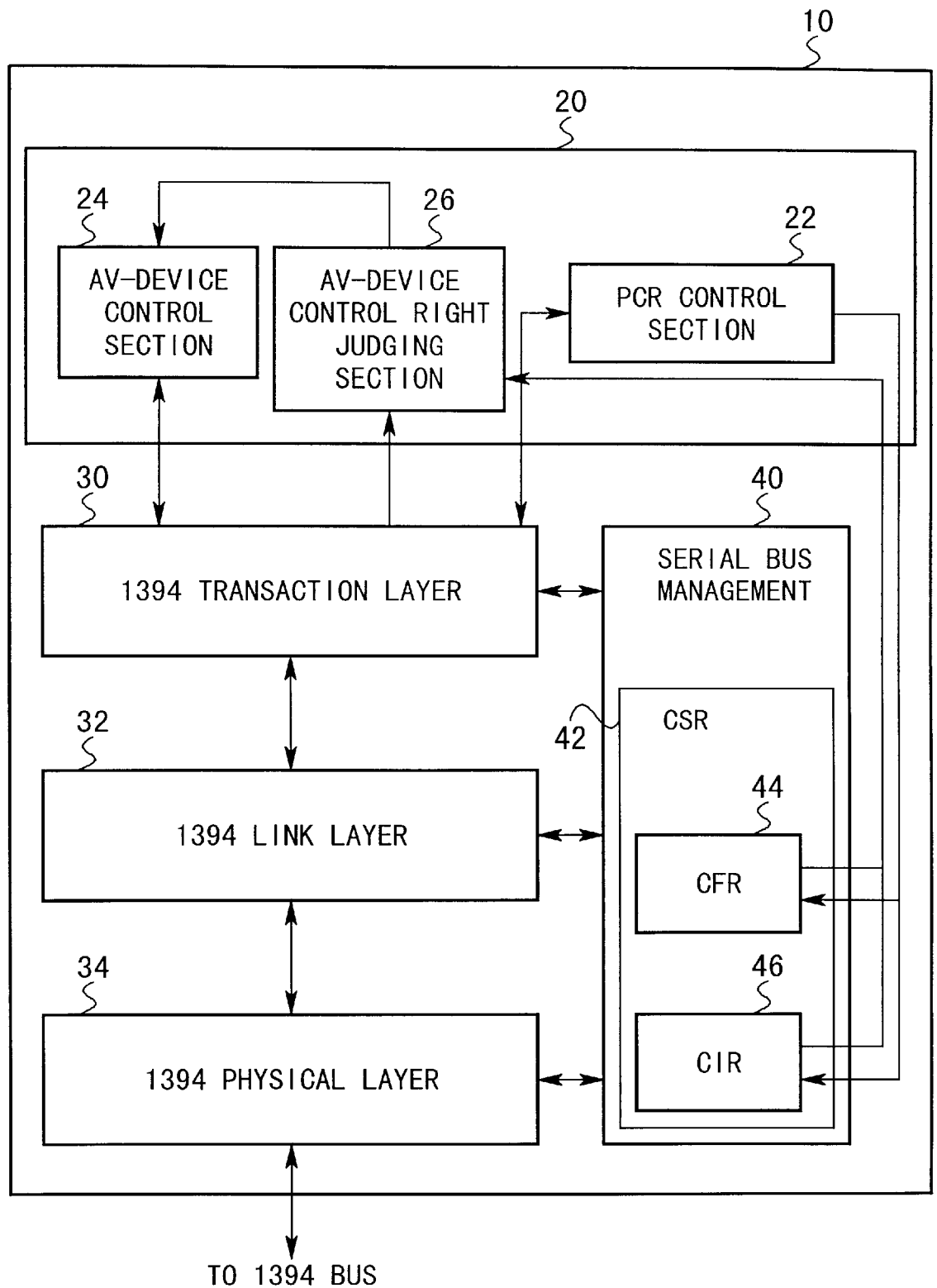
FIG. 1 is a block diagram of a connection control apparatus provided in accordance with one embodiment of the invention.

FIG. 1 is a block diagram of a connection control apparatus provided in accordance with an embodiment of the invention when applied to a 1394 bus system.

In FIG. 1, the connection control apparatus 10 according to the invention generally comprises a connection control section 20, a 1394 transaction layer 30, a 1394 link layer 32, a 1393 physical layer 34, and a serial bus management section 40.

Figure 11:
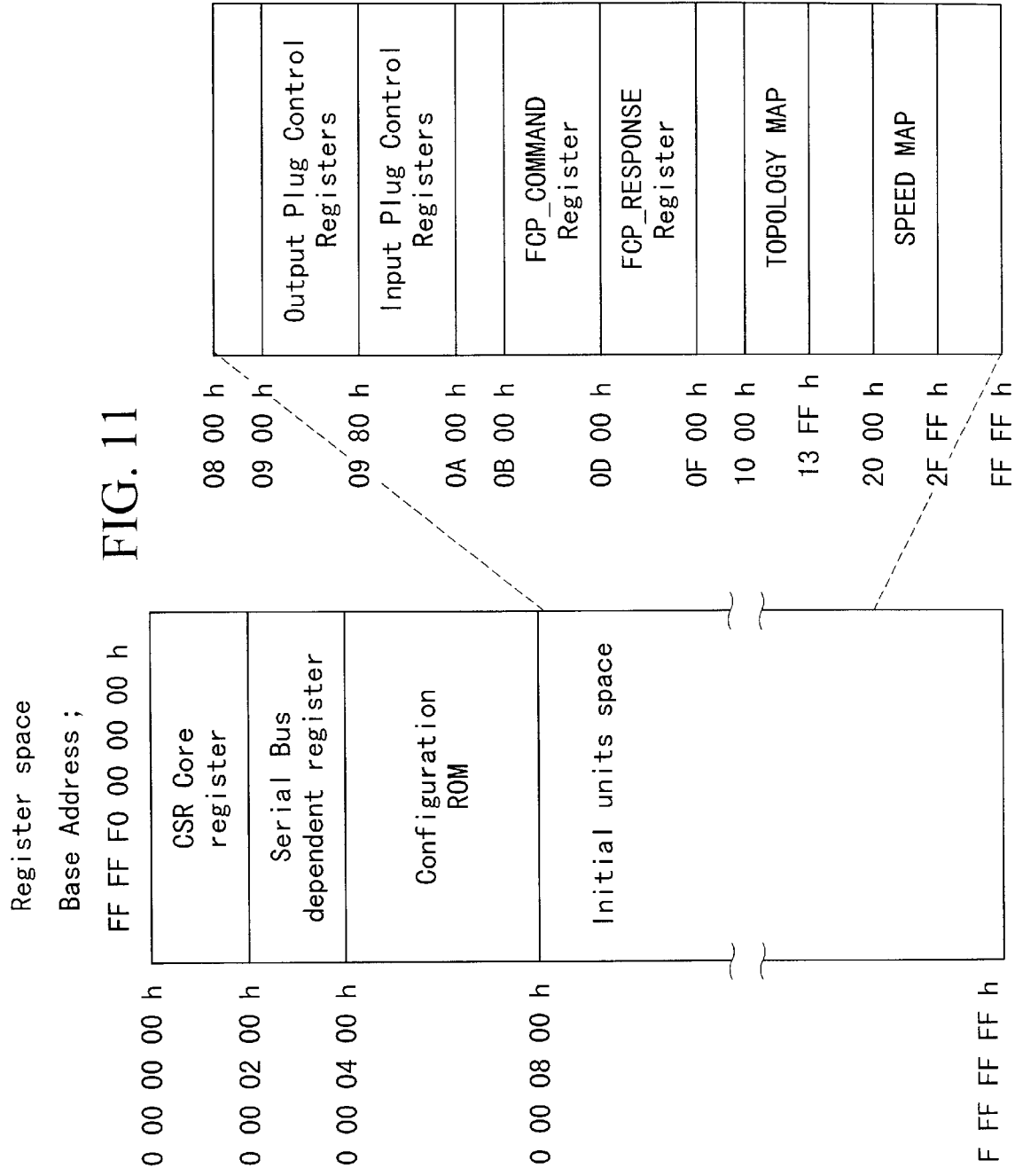
FIG. 11 is an illustration showing the structure of the IEEE 1394 CSR space.
Figure 12:
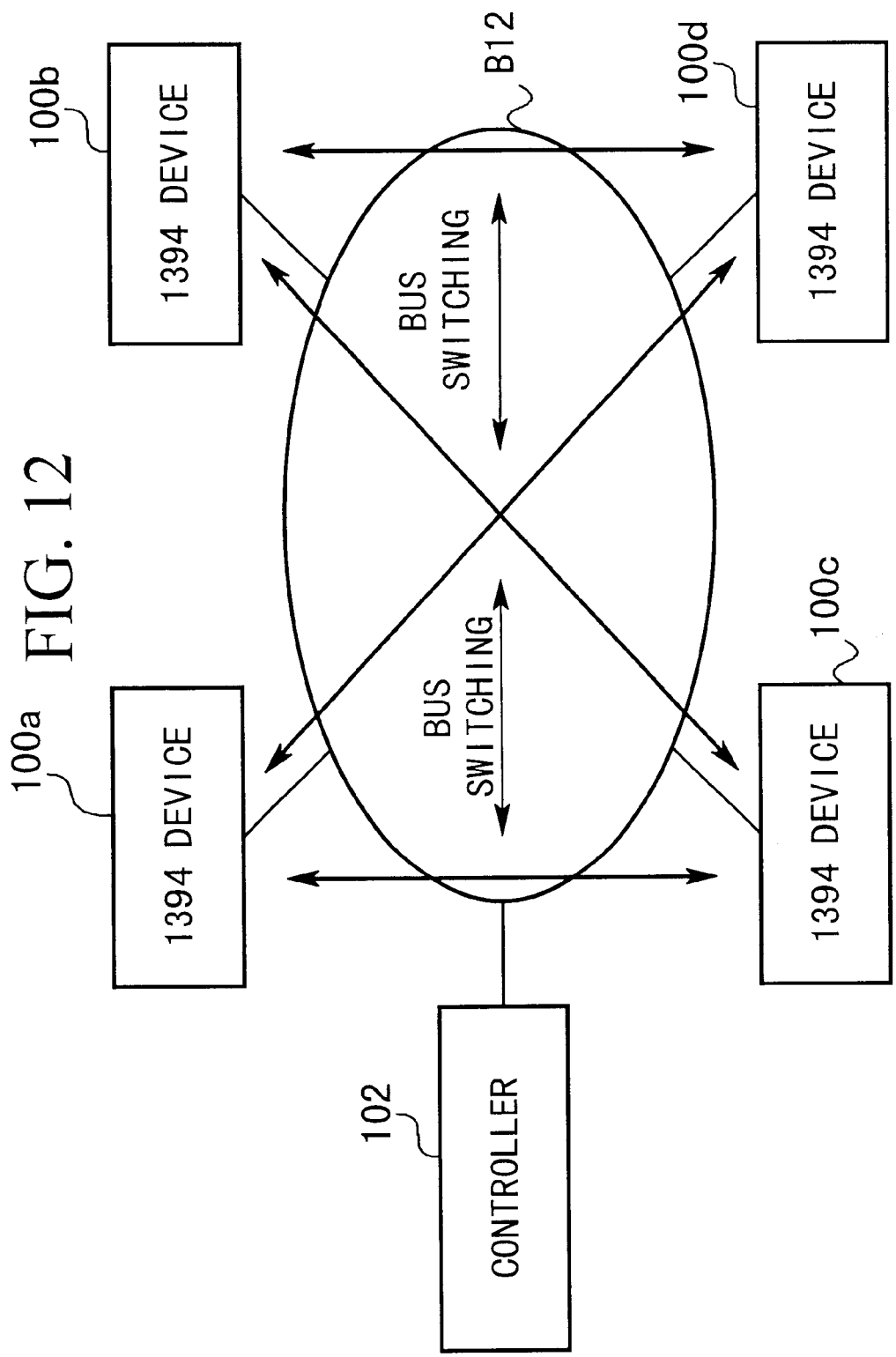
FIG. 12 is an illustration showing the conventional connection control.
Figure 13:
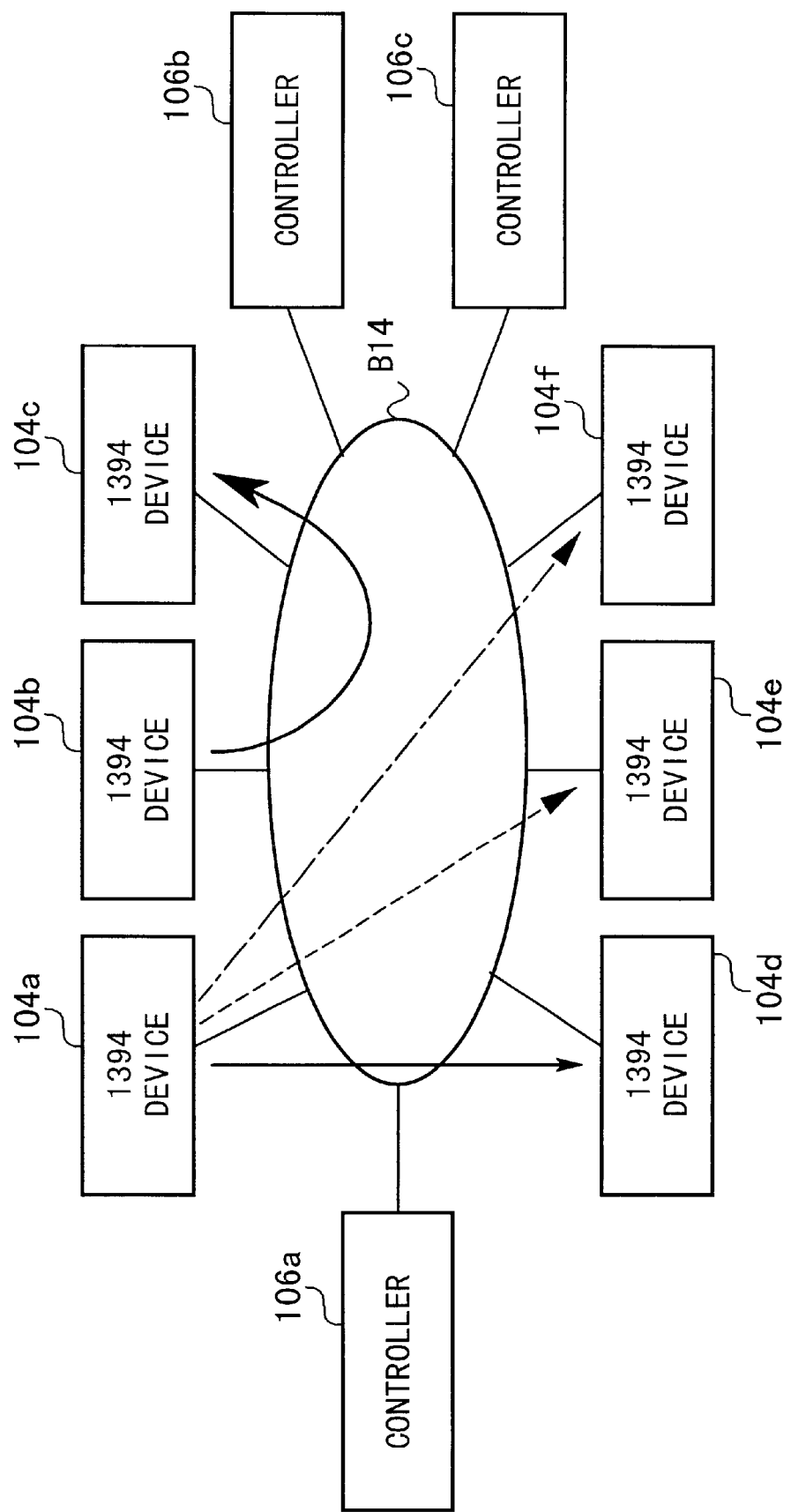
FIG. 13 is an illustration showing the conventional bus structure and exemplary connections made therein from which the problem of the prior art is seen.

The connection control section 20 comprises a PCR control section 22, an AV-device control section 24, and an AV-device control right judging section 26. The serial bus management section 40 is provided with a 1394 CSR space 42 described above with reference to FIG. 11, which space includes a control flag register (hereinafter referred to as "CFR") 44 and a control information register (hereinafter referred to as "CIR") 46. These registers are provided, in brief, for storing the statuses of respective devices connected to the 1394 bus, for example, the status of connection between AV devices and the like.

Figure 2:
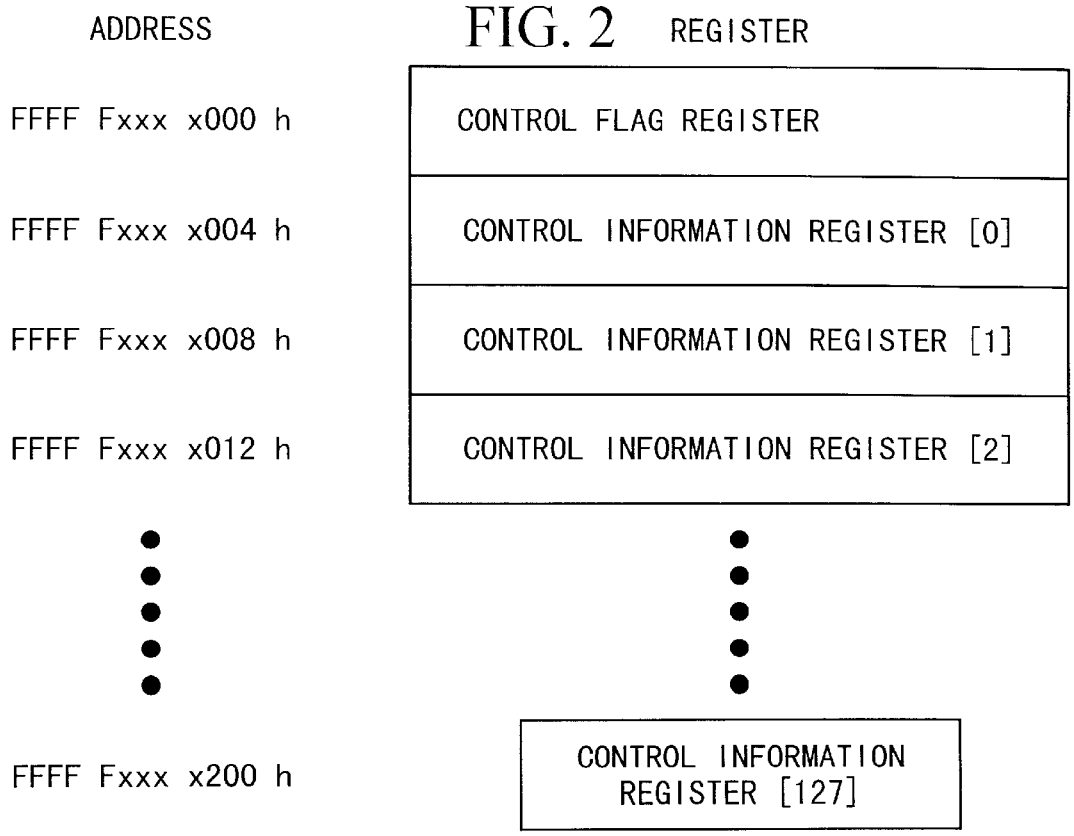
FIG. 2 is an illustration showing addresses of CFR 44 and CIR 46.

FIG. 2 shows addresses of the CFR 44 and CIR 46. The CFR 44 occupies only one quadlet (four bytes) in the 1394 CSR space, while the CIR 46 is provided by reserving in the 1394 CSR space an area having a certain width. The CFR 44 and the CIR 46 are provided in an empty area (for example, in those addresses after FF FF F0 30 00h) of the 1394 CSR space shown in FIG. 11. In FIG. 2, 128 quadlets following the CFR address are assigned to the CIR 46.

Figure 3A:
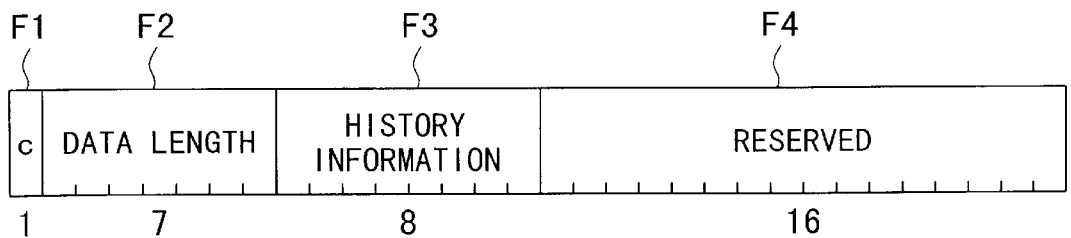
FIG. 3 is an illustration showing formats of the CFR 44 and CIR 46, wherein (a) is the format of the CFR and (b) is the format of the CIR.
Figure 3B:
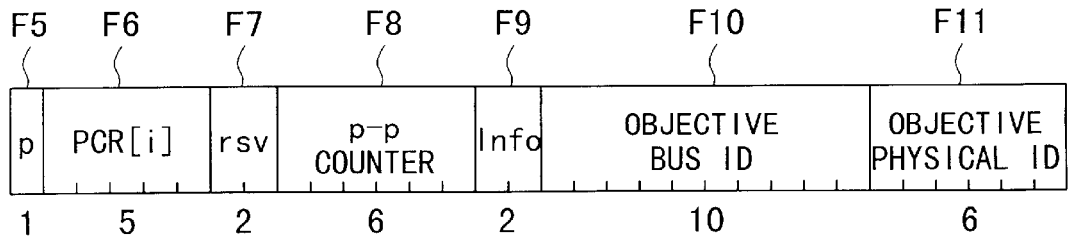

FIG. 3 is an illustration showing formats of the CFR 44 and CIR 46, wherein (a) is the format of the CFR and (b) is the format of the CIR.

First, each field of the CFR format will be described. A field F1 is a field for storing a flag indicating that this is a connection control apparatus. In the example of FIG. 3, "c" is indicated in this field F1. A field F2 is a field for storing a quadlet length of the CIR 46 following the CFR 44. In the example of FIG. 3, "data length" is indicated in this field F2. A field F3 is a field for storing information about the CIR 46 updated by additions and/or deletions. In the example of FIG. 3, "history information" is indicated in this field F3. A field F4 is a reserved field, and "reserved" is indicated in this field F4 shown in FIG. 3. The history information contained in the field F3 is increased by one (incremented) each time the CIR 46 is updated.

Next, each field of the CIR format will be described. A field F5 is a field for storing information indicative of whether the relevant PCR is for input or output, in which "1" is stored in the case of an oPCR and "0" is stored in the case of an iPCR. In FIG. 3, "p" is indicated in this field F5. A field F6 is a field for storing the number of the PCR mounted in the AV device. In the example of FIG. 3, "PCR[i]" is indicated in this field F6. A field F7 is a reserved area, and "rsv" is indicated in this field F7 in FIG. 3. A field F8 is a field for storing a counter value of point-to-point connections of the relevant PCR. In the example of FIG. 3, "p-p count" is indicated in this field F8. This field F8 contains information indicating the order number of the connection when a plurality of connections have been made.

A field F9 is a field for storing the type of the relevant CIR 46. When containing a value "00", this field indicates that the relevant CIR contains information about the PCR set by the present connection control apparatus. When containing a value "01", this field indicates that the relevant CIR contains information about the PCR set by the connection control apparatus when a point-to-point connection established by another connection control apparatus has been released. The value stored in the field F8 and the information stored in the field F9 indicate the priority of the connection.

Values "10" and "11" are treated as reserved codes and not used at present. In the example of FIG. 3, "Info" is indicated in this field F9. Fields F10 and F11 are fields for storing a higher order ten-bit bus ID and a lower order six-bit physical ID, respectively, of the node ID of an AV device for which the PCR control section 22 has set the PCR. In the example of FIG. 3, "objective bus ID" and "objective physical ID" are indicated in these fields F10 and F11, respectively. Any devices connected to a 1394 bus are called "nodes" and require IDs in order to be discriminated from each other. In other words, it will be possible to specify the destination device by storing its "p", "PCR[i]", "objective bus ID", and "objective physical ID".

As shown in FIG. 3 (b), an amount of data equal to one quadlet is needed to store information about a connection between devices coupled to the 1394 bus. Since the CIR 46 comprises 128 quadlets, it can store information about up to 128 connections.

Referring back to FIG. 1, the PCR control section 22 transmits packets through the 1394 transaction layer 30, the 1394 link layer 32 and the 1394 physical layer 34 in order to rewrite an arbitrary PCR of an arbitrary AV device on the 1394 bus. Simultaneously with the rewriting of the PCR, the PCR control section 22 updates the CFR 44 and, at the same time, performs addition and/or deletion with respect to the CIR 64. The rules for rewriting the CFR 44 and CIR 64 will be described later in detail.

The AV-device control section 24 sends AV commands through the 1394 transaction layer 30, the 1394 link layer 32, and the 1394 physical layer 34 to that of the AV devices connected to the 1394 bus which has been allowed by the AV-device control right judging section 26, to thereby control operations of that device such as play, stop, rewind and record.

The AV-device control right judging section 26 reads the information stored in the CFR 44 and the CIR 46 arranged in the CSR space 42 of the present connection control apparatus and also reads the information stored in the CFRs and CIRs arranged in the CSR spaces of other connection control apparatuses present on the 1394 bus. The AV-device control right judging section 26 then determines for each AV device the connection control apparatus which has the right of controlling that AV device based on the read information, and informs the AV-device control section 24 of those AV devices which the present connection control apparatus can control.

An outline of operation of the connection control apparatus provided in accordance with the embodiment of the invention having the above structure will now be described.

Figure 4:
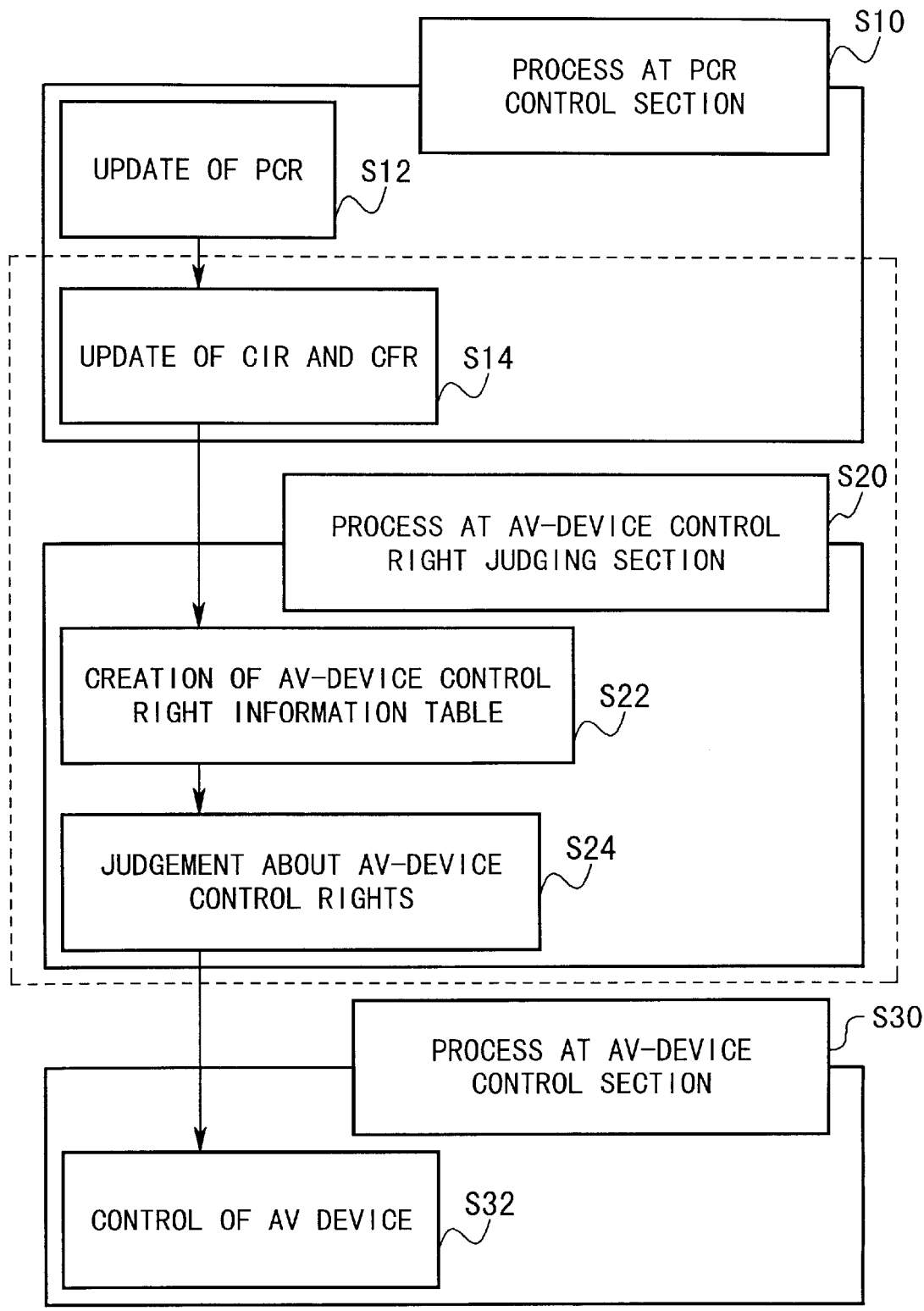
FIG. 4 is an illustration showing generally the process performed in the connection control apparatus according to the embodiment of the invention.

FIG. 4 shows a general process in the connection control apparatus provided in accordance with the embodiment of the present invention.

First, a process at the PCR control section 22 is performed (step S10). In this process, after a PCR updating process is carried out for those AV devices on the 1394 bus which are 1394 devices (step S12), the CFR 44 and CIR 46 are updated (step S14). During this process, information about the 1394 devices connected to the 1394 bus such as their connection statuses is collected, and the information collected previously is updated.

Next, all the information contained in the CFR 44 and the CUR 46 of the present connection control apparatus as well as all the information contained in the CFRs 44 and the CIRs 46 of other connection control apparatuses on the 1394 bus are read by the AV-device control right judging section 26, and based on this information a table of information about the rights of controlling AV devices is created (step S20). During this process, the AV-device control right information table is created first (step S22). To be brief, this AV-device control right information table is a list of the CFR information and the CIR information of all the connection control apparatuses connected to the 1394 bus. Next, a judgment about the AV-device control rights is made based on the AV-device control right information table as created in step S22 (step S24). During this process, the connection statuses of the devices connected to the 1394 bus are analyzed and a judgment about the control rights is made.

Lastly, a process for controlling an AV device is performed at the AV-device control section 24 by means of AV/C commands with respect to each AV device whose control is allowed in the AV-device control right judging process at the step S24 (steps S30 and S32).

Each process shown in FIG. 4 will now be described in more detail.

Figure 5:
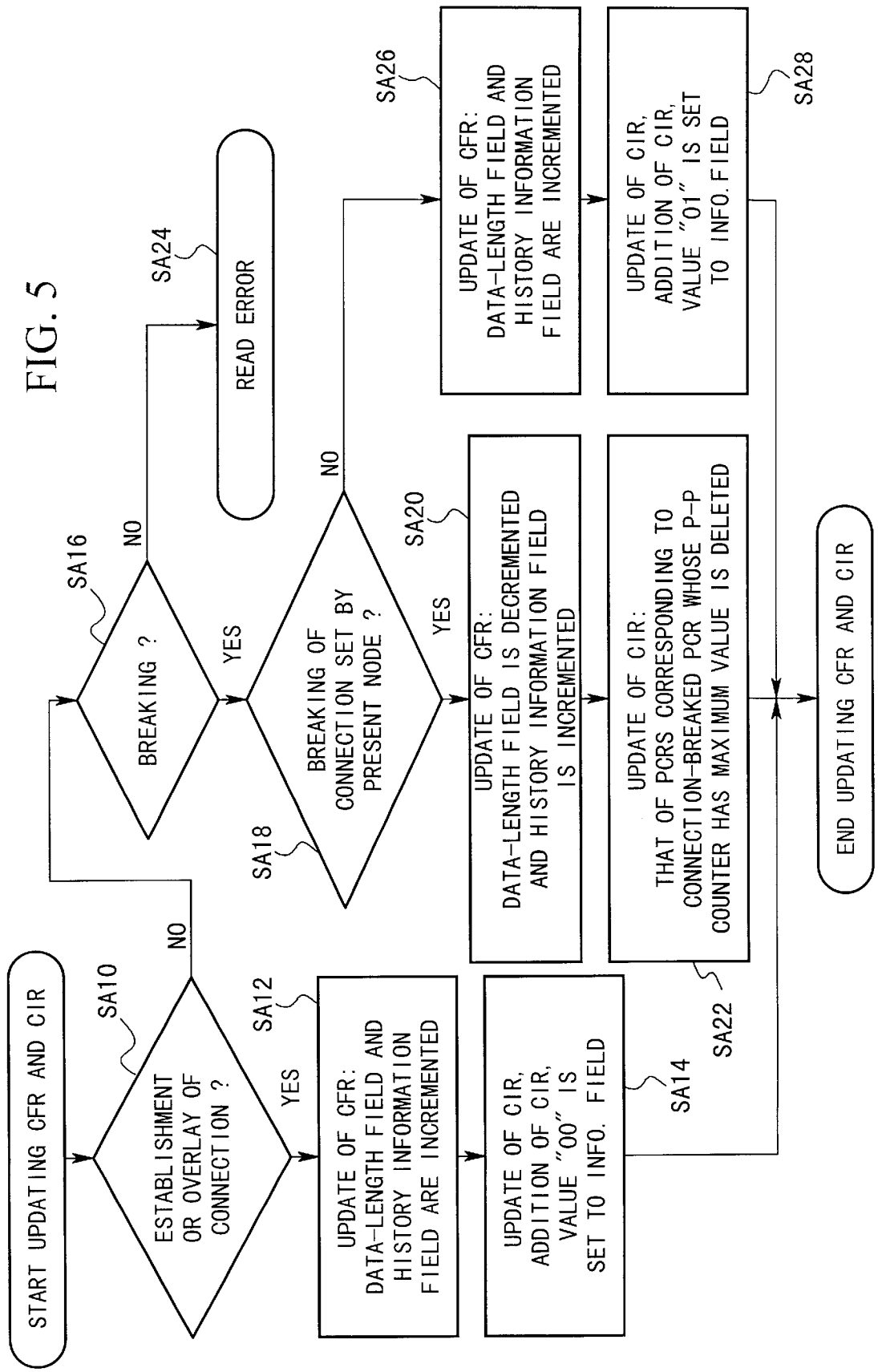
FIG. 5 is a detailed flowchart of the process (step S14) for updating the CFR 44 and CIR 46 of FIG. 4.

FIG. 5 is a detailed flowchart of the process of updating the CFR 44 and the CIR 46 shown in FIG. 4 (step 14). This process is performed at the time when one PCR updating process performed with respect to a certain AV device by the connection control apparatus has been completed.

When this process is started, it is determined whether the PCR updating process performed with respect to the certain AV device by the connection control apparatus was a process for establishing a connection or a process for adding or overlaying a connection (step SA10). The "establishing a connection" means that a connection is newly established between devices which have had no connection therebetween. The "overlaying a connection" means that, when a connection has already been established between certain devices, a further connection is added therebetween or another connection is established between these devices and another device.

Figure 9:
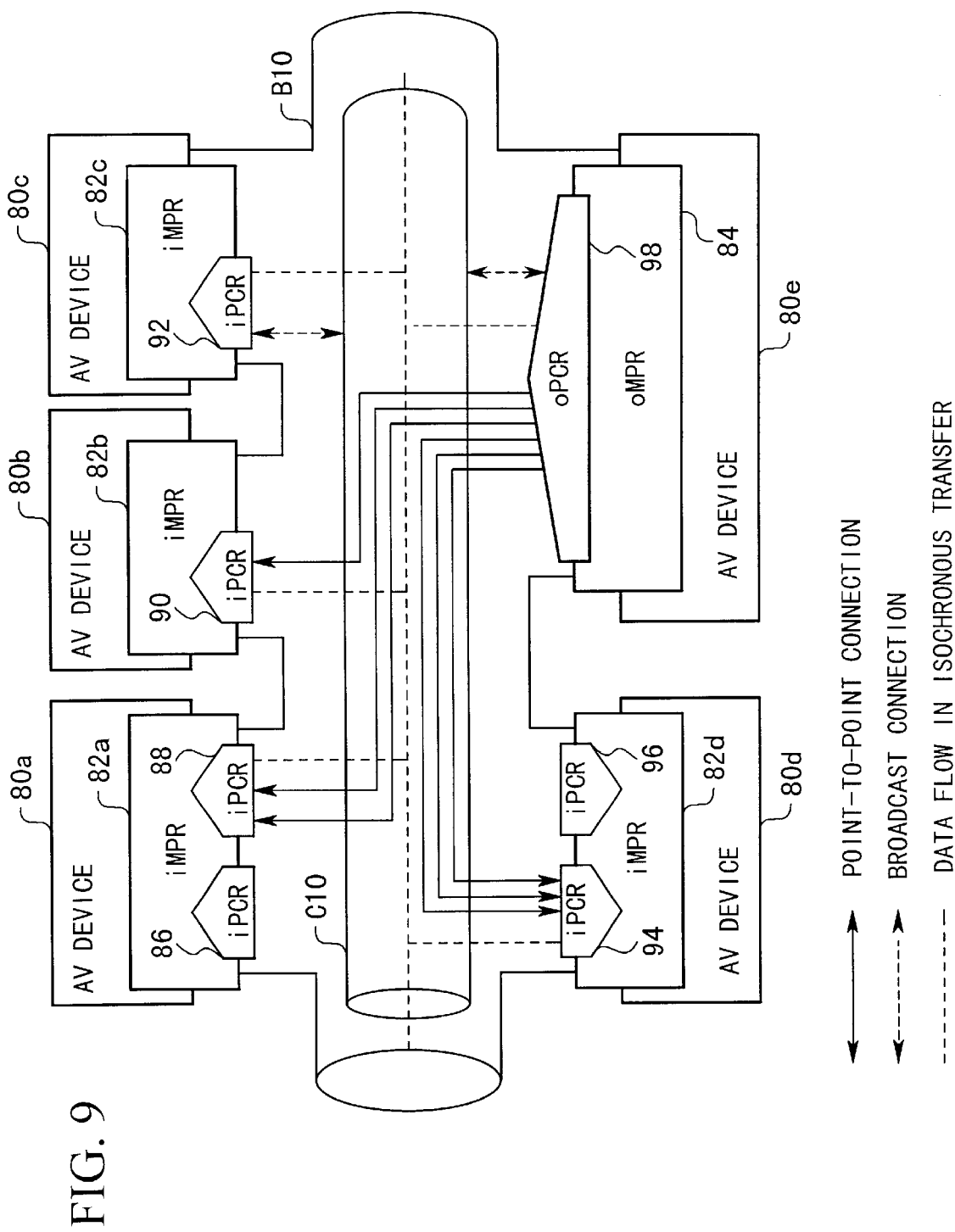
FIG. 9 is an illustration showing a network constructed for AV devices (which are 1394 devices) with an IEEE 1394 bus.

Reference is now made to FIG. 9 to render the description easy to understand.

It is considered an establishment of connection if a connection is established, for example, between the AV device 80a and the AV device 80e when no connection has been established among the AV devices 80a to 80e shown in FIG. 9. It is considered an overlay of connection if a further connection is established between the AV device 80e and the AV device 80d when a connection has already been established between these devices, or if a connection is established between the AV device 80e and the AV device 80b when a connection has already been established between the AV device 80e and the AV device 80d.

If the result of the determination at the step SA10 is "YES", i.e., if a new connection (which includes an overlay of a connection in this case) is established, the processing proceeds to step SA12.

In the step SA12, a process for increasing each value of the data-length field F2 and the history information field F3 of the CFR 44 by one, i.e., an incrementing process, is performed. The value of the data-length field F2 is incremented to record the fact that a new connection has been added, while the value of the history information field F3 is incremented to record the fact that the CIR 46 has been updated. That is to say, the greater the value of the history information field of the device connected to the 1394 bus, the newer the recorded information.

After the process at the step SA12 is completed, the processing proceeds to step SA14 wherein a process for adding the information about the PCR updating process, which has actually been done, to the CIR information is carried out. In this process, however, a value of the Info. field is set to "00". In other words, the CIR is configured to indicate that it contains the information of the PCR set by the present connection control apparatus. The information to be stored in the CIR 46 is shown in FIG. 3. When the process at the step SA14 is completed, the process of updating CFR and CIR is terminated.

In the case where the result of determination at the step SA10 is "NO", then the processing proceeds to step SA16. In this step SA16, it is determined whether the PCR updating process was a process for releasing a connection (or a process for breaking). The term "breaking" means an operation to release a connection which has been established between certain devices. When the above determination result is "YES", the processing proceeds to step SA18. In the step SA18, it is determined whether the breaking was for the connection established by the present node (or the present connection control apparatus). If this determination result is "YES", the processing proceeds to step SA20 at which a process for decreasing by one (or decrementing) the value of the data-length field F2 of the CFR 44 and for incrementing the value of the history information field F3 of the CFR 44 is performed. In other words, since the number of connections which the present connection control apparatus controls decreases by one, the value of the data-length field F2 is decremented, whereas the value of the history information field F3 is incremented since the CIR 46 is updated.

After the process at the step SA20 is completed, the processing proceeds to step SA22, wherein a process is performed to delete the information of the CIRs 46 corresponding to the PCR for which the breaking was made which has the maximum value in the p-p counter. In this case, the CIRs 46 corresponding to the PCR for which the breaking was made are those CIRs whose fields F5 (p), F6 (PCR[i]), F10 (objective bus ID) and F11 (objective physical ID) contain the same values, respectively. When this process is completed, the process for updating CFR and CIR is terminated.

In the case where the determination result at the step SA16 is "NO", the processing proceeds to step SA24 at which a process for dealing with a read error is carried out since this does not correspond to a process for establishing, overlaying, or breaking a connection.

When the determination result at the step SA18 is "NO", the processing proceeds to step SA26. This corresponds to the case where a connection established by another node (or another connection control apparatus) was released by the present node (the present connection control apparatus itself). In the step SA26, a process for incrementing the values of the data-length field and the history information field of the CFR 44 is performed. After the process at the step SA26 is completed, a process for adding the information about the PCR updating process which has actually been done to the CIR information is carried out at step SA28.

In this process, however, a value "01" is set to the Info. field. The information to be stored in the CIR 46 is shown in FIG. 3. When the process at the step SA28 is completed, this process for updating CFR 44 and CIR 46 is terminated.

A process for creating the AV-device control right information table shown in FIG. 4 (step S22) will now be described in more detail.

Figure 6:
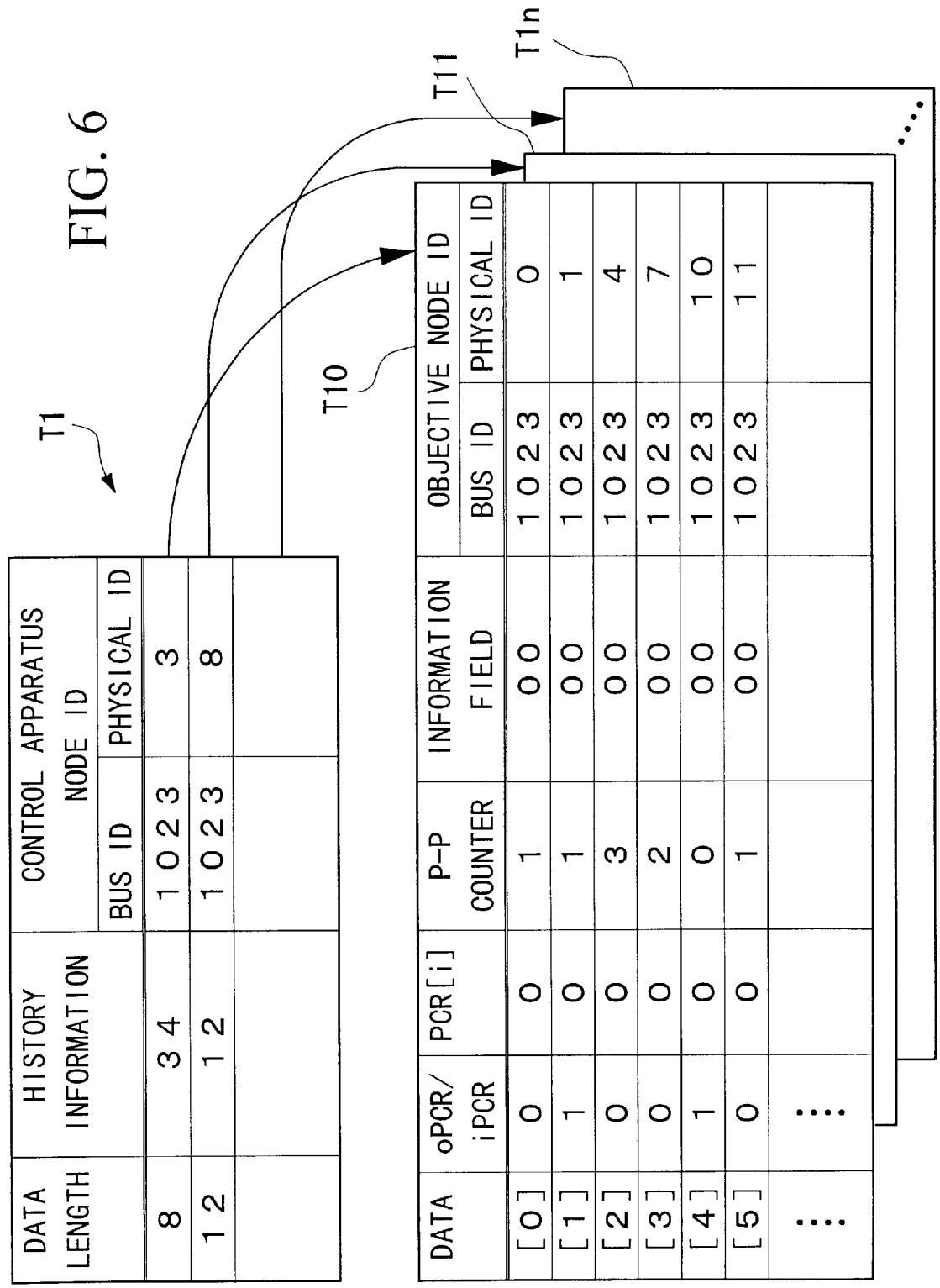
FIG. 6 is an illustration showing an exemplary AV-device control right information table created in the process of step S22.
Figure 7:
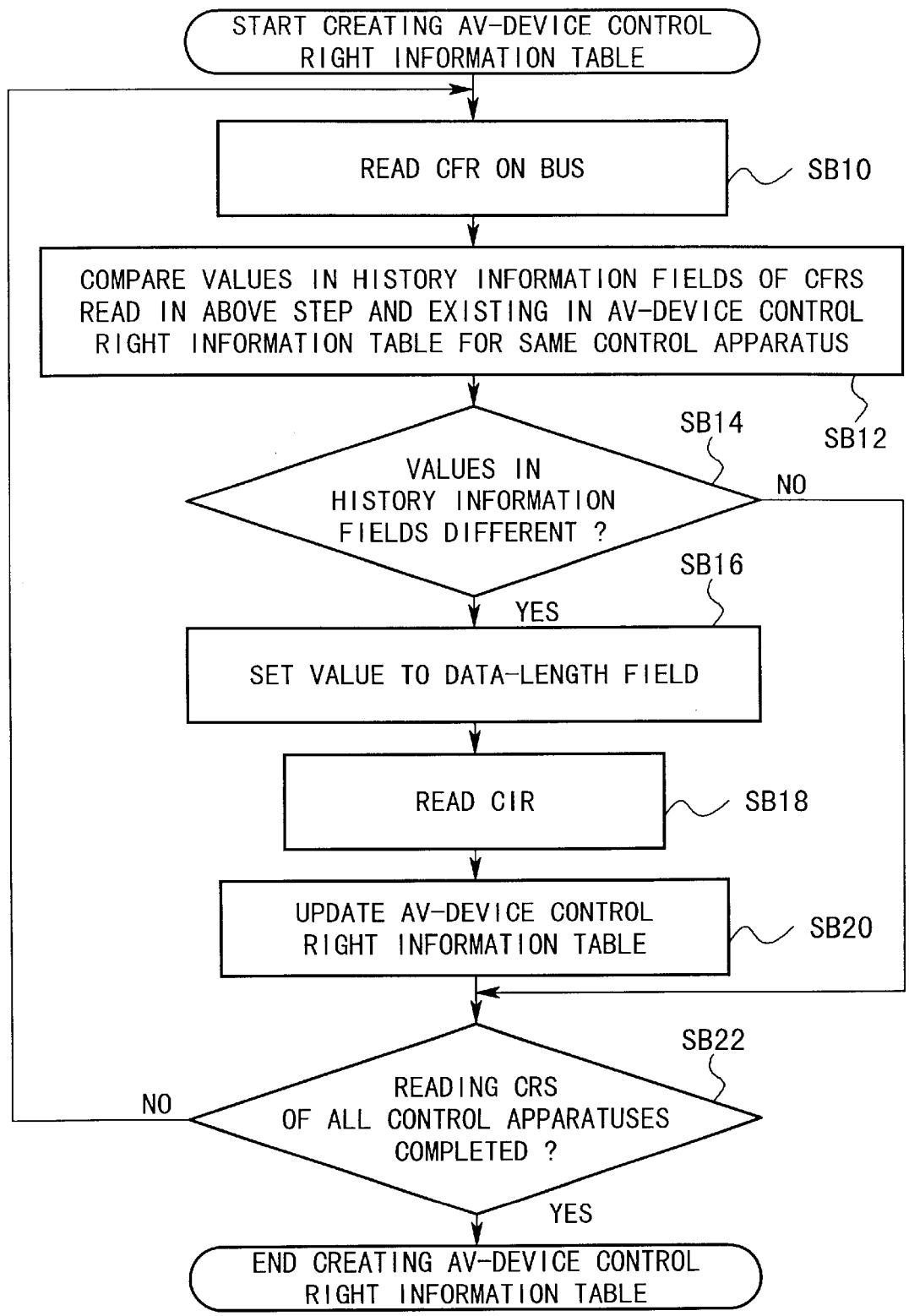
FIG. 7 is a detailed flowchart of the process (step S22) for creating the AV-device control right information table of FIG. 4.

FIG. 7 is a detailed flow chart of the process for creating the AV-device control right information table shown in FIG. 4 (step S22), and FIG. 6 shows one example of such tables created by the process of the step S22.

As shown in FIG. 6, the table contains CFR information T1, which includes information about the 0th to nth connection control apparatuses (n being a natural number) in the sequential order, and CIR information T10 to T1n each suspended from a respective information portion of the CFR information Ti. That is to say, the CIR information T10', the CIR information T11 . . . the CIR information T1n belong to the control apparatuses 0, 1 . . . n, respectively.

The process for creating the AV-device control right information table will now be described in more detail with reference to FIG. 7. This process is performed after the updating of CFR 44 and CIR 46 shown in FIG. 5 is completed.

Upon stating this process, a process for reading the CFR 44 contained in a certain connection control apparatus on the bus is carried out (step SB10). If the CFR 44 which has previously been read exists, then a process for comparing the values in the history information fields of the CFRs 44 for the same connection control apparatus is performed (step SB12).

When the process of the step SB12 is completed, the processing proceeds to step SB14 at which a process is performed to determine whether the history information values differ or not. In other words, a determination is made as to whether the read information of the CFR 44 has been updated. If the result of this determination is "YES", the processing then proceeds to step SB16. In this step SB16, a process for setting the value of the data-length field of the CFR 44 is performed. After the process at the step SB16, a process for reading the CIR 46 over the length defined by the value in the data-length field F2 set in the process at the step SB16 is performed (step SB18).

Upon completing the process at the step SB 18, a process for storing the CFR 44 and the CIR 46 as obtained in the processes at the steps SB10 and SB18 in the AV-device control right information table is performed (step SB20). Thereafter, a process for determining whether the reading of CFRs 44 has been completed with respect to all the connection control apparatuses on the bus is performed at step SB22. If the result of this determination is "NO", then the processing returns to the step SB10. On the other hand, if the result of the determination at the step SB22 is "YES", this process for creating the AV-device control right information table ends.

In the case where the determination result at the step SB14 is "NO", the processing proceeds to the step SB22 to continue the above processes.

Figure 8:
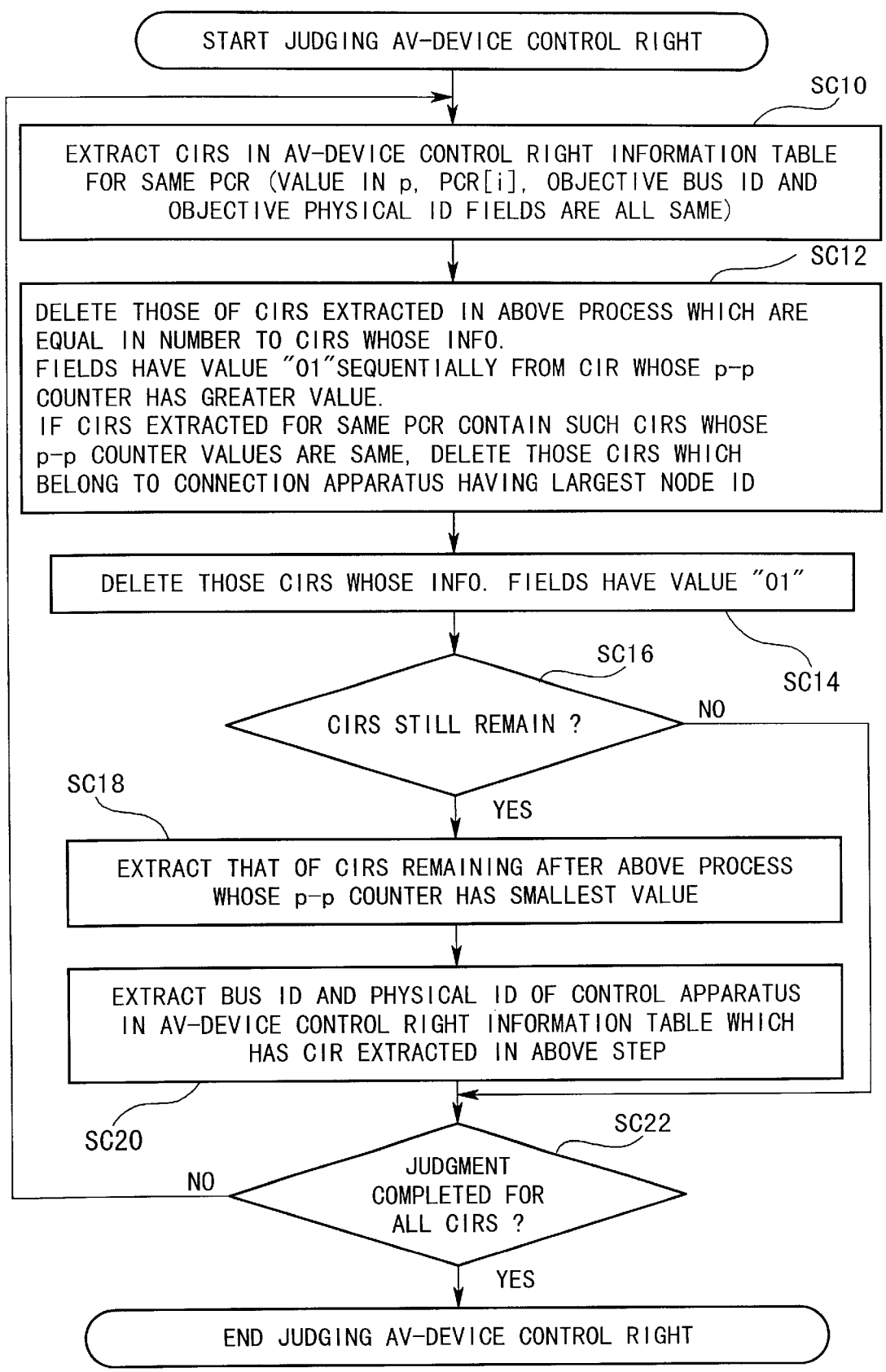
FIG. 8 is a detailed flowchart of the process (step S24) for judging the AV-device control right of FIG. 4.

Next, description will be made of the AV-device control right judging process (step S24) shown in FIG. 4. FIG. 8 is a flow chart showing the AV-device control right judging process (step S24) of FIG. 4 in more detail. This process is executed by the AV-device control right judging section 26 (refer to FIG. 1) based on the AV-device control right information table created in the above-described process as shown in FIG. 6.

When the processing starts, a process for extracting all the CIRs of the same PCR from the AV-device control right information table is carried out (step SC10). Here, the same PCR signifies those of the PCRs whose p, PCR[i], objective ID, and objective physical ID fields have the same values, respectively. When the process at the step SC10 has been completed, a process is performed to delete those of the CIRs extracted at the step SC10 which correspond in number to the CIRs whose Info. fields contain the value "01" sequentially from the CIR whose p-p counter field F8 contains a greater value. In this case, however, if the CIRs extracted for the same PCR include such CIRs whose p-p counter fields F8 have the same value, the CIRs to be deleted due to their Info. fields containing the value "01" should be those which belong to the connection control apparatus having the largest node ID number (step SC12).

Upon completion of the process of the step SC12, a process for deleting those CIRs whose Info. fields F9 have the value "01", is performed (step SC14). At the time when the process of the step SC14 is completed, a process for determining whether any CIRs still remain is performed (step SC16). If the result of the determination at the step SC16 is "YES", the processing proceeds to step SC18.

In the step SC18, a process for extracting that of the CIRs remaining after the step SC14 which has the smallest value in the p-p counter field F8. When the process at the step SC18 is completed, a process for extracting the bus ID and the physical ID of that connection control apparatus in the AV-device control right information table to which the CIR extracted in the process of the step SC18 and for storing these IDs is performed (step SC20). By this process, the right for controlling the AV device is decided.

When the process of the step SC20 is completed, a process is carried out to determine whether the judgment about the right for controlling AV devices has been performed with respect to all the CIRs in the AV-device control right information table (step SC22). If the result of this determination is "NO", then the processing returns to the step SC10, while this AV-device control right judging process ends if the result of the determination at the step SC22 is "YES". In the case where the result of the determination at the step SC16 is "NO", the processing proceeds to the step SC22 to carry out the above-described determination process.

Although the connection control apparatus according to the invention has been described with reference to its one embodiment, the present invention should not be restricted only to that embodiment but can freely be modified within the scope of the invention. For example, although the present invention has been described in the above embodiment as being applied to the IEEE 1394 standard, the present invention can be applied to any connection control apparatus connected to a bus through which packetbased bidirectional serial communication is possible, and to which a plurality of AV devices can be connected.

What is claimed is:

1. A connection control apparatus adapted to be connected to a bus through which packet-based bi-directional serial communication can be performed and to which a plurality of apparatuses can be connected, said connection control apparatus comprising:

a memory that stores at least a first connection status of a logical connection of a controllable apparatus through said bus to at least one other apparatus; and a control section that determines whether or not said connection control apparatus is authorized to control said controllable apparatus based on at least said first connection status.

2. A connection control apparatus according to claim 1, further comprising reading section that inputs at least said first connection status from said bus and stores at least said first connection status in said memory.

3. A connection control apparatus according to claim 1, wherein said first connection status includes information corresponding to a destination address of said controllable apparatus.

4. A connection control apparatus according to claim 1, wherein said first connection status includes information corresponding to priorities of connections of said controllable apparatus.

5. A connection control apparatus according to claim 1, wherein said bus is a bus which complies with the IEEE 1394 bus standard.

6. A connection control apparatus according to claim 2, wherein said first connection status includes history information of updates of said first connection status,
wherein said connection control apparatus further comprises an updating section that compares a new connection status of said controllable apparatus read by said reading section with said first connection status stored in said memory, and
if said new connection status is different than said first connection status, said updating section updates said first connection based on said new connection status to create an updated first connection status and stores said updated status in said memory.

7. A connection control apparatus according to claim 1, wherein said first connection status includes information about another connection control apparatus which has released said logical connection of said controllable apparatus.

8. A connection control apparatus according to claim 4, wherein said control section determines whether or not said connection control apparatus is authorized to control said controllable apparatus based on said information indicative of priorities.

9. A connection control apparatus connected to an IEEE 1394 bus for controlling a connection between apparatuses each having a plug control register, said connection control apparatus comprising:
a plug control register controlling section for transmitting/ receiving packets through said 1394 bus to control the plug control registers of controllable apparatuses connected to said 1394 bus and to generate connection information regarding connections of said controllable apparatuses to said 1394 bus;
a control information register for storing said connection information generated by said plug control register controlling section;
a control flag register for indicating a presence of an update of said control information register and an amount of information in said control information register;
an apparatus control section for transmitting/receiving packets through said 1394 bus to control operations of said controllable apparatuses connected to said 1394 bus; and
an apparatus control right judging section for collecting values in said control information register and said control flag register with respect to all of said controllable apparatuses connected to said 1394 bus to determine selected apparatuses of said controllable apparatuses are allowed to be controlled by said apparatus control section and to inform said apparatus control section of said selected apparatuses.

10. A connection control apparatus according to claim 9, wherein said control flag register comprises:
a data-length field for representing an amount of information in said control information register; and
a history information field whose value represents a presence of an update of said control information register and is incremented each time said control information register is updated.

11. A connection control apparatus according to claim 9, wherein said control information register comprises:
a first field for representing whether said plug control register is for input or for output;
a second field for representing a serial number of said plug control register provided in a corresponding apparatus of said controllable apparatuses;
a third field for representing a value in a point-to-point connection counter of said plug control register;
a fourth field for representing a type of said control information register; and
objective bus ID and objective physical ID fields for representing a bus ID and a physical ID of said corresponding apparatus provided with the plug control register.

12. A connection control apparatus according to claim 11, wherein said fourth field for representing the type of said control information register is a field for storing a value indicating that information about the plug control register set by said connection control apparatus is stored and a value indicating that information about the plug control register by which connection control apparatus released a point-to-point connection established by another apparatus is stored.

13. A connection control apparatus according to claim 9, wherein said control flag register and said control information register are arranged in a control status register space as defined in the IEEE 1212 standard.

14. A system comprising:
a first connection control apparatus coupled to a bus through which packet-based bidirectional serial communication can be performed, wherein said first connection control apparatus comprises:
a first memory that stores at least a first connection status of a first logical connection of a first controllable apparatus to said bus, and
a first control section that determines whether or not said first connection control apparatus is authorized to control said first controllable apparatus based on at least said first connection status,
wherein said first connection control device is capable of establishing said first logical connection; and
a second connection control apparatus coupled to said bus, wherein said second connection control apparatus is capable of establishing said first logical connection.

15. The system as claimed in claim 14, wherein said first control section determines whether or not said first connection control apparatus is authorized to control said first controllable apparatus based on whether said first connection control apparatus or said second connection control apparatus established said first logical connection.

16. The system as claimed in claim 15, wherein said first control section determines that said first connection control apparatus is authorized to control said first controllable apparatus when said first connection control apparatus established said first logical connection.

17. The system as claimed in claim 15, wherein said first control section determines that said first connection control apparatus is not authorized to control said first controllable apparatus when said second connection control apparatus established said first logical connection.

18. The system as claimed in claim 16, wherein said first control section determines that said first connection control apparatus is not authorized to control said first controllable apparatus when said second connection control apparatus established said first logical connection.

19. The system as claimed in claim 14, wherein said second connection control apparatus comprises:
   a second memory that stores at least said first connection status; and
   a second control section that determines whether or not said second connection control apparatus is authorized to control said first controllable apparatus based on at least said first connection status.

20. The system as claimed in claim 19, wherein said first control section that determines whether or not said first connection control apparatus is authorized to control said first controllable apparatus based on whether said first connection control apparatus or said second connection control apparatus established said first logical connection, and wherein said second control section determines whether or not said second connection control apparatus is authorized to control said first controllable apparatus based on whether said first connection control apparatus or said second connection control apparatus established said first logical connection.

21. A first connection control apparatus, comprising:

a first memory that stores at least a first connection status of a first logical connection of a first controllable apparatus to a bus, wherein packet-based bi-directional serial communication can be performed via said bus; and a first control section that determines whether or not said first connection control apparatus is authorized to control said first controllable apparatus, wherein said first control section that determines whether or not said first connection control apparatus is authorized to control said first controllable apparatus based on whether said first connection control apparatus or a second connection control apparatus established said first logical connection.

* * * * *